United States Patent

Nakaya et al.

[11] Patent Number: 5,963,590
[45] Date of Patent: Oct. 5, 1999

[54] METHOD FOR RECEIVING DIGITAL RADIO SIGNALS AND A DIGITAL RADIO SIGNALS RECEIVER

[75] Inventors: Kazuyoshi Nakaya; Yoshiyuki Tabata, both of Kanagawa, Japan

[73] Assignee: Murata Mfg. Co., Ltd., Kyoto, Japan

[21] Appl. No.: 08/345,665

[22] Filed: Nov. 28, 1994

[30] Foreign Application Priority Data

Nov. 29, 1993 [JP] Japan ................................. 5-298450

[51] Int. Cl.$^6$ .......................... H04B 3/46; H04B 17/00
[52] U.S. Cl. ....................... 375/227; 371/5.1; 455/226.2; 375/355
[58] Field of Search ..................... 375/224, 227, 375/329, 330, 331, 332, 346, 350, 355, 225; 329/304, 306; 371/5.1, 5.2, 5.5, 5.4; 455/67.3, 226.2, 226.3, 226.1; 324/76.38

[56] References Cited

U.S. PATENT DOCUMENTS

| | | | |
|---|---|---|---|
| 4,028,626 | 6/1977 | Motley et al. | 375/355 |
| 4,514,697 | 4/1985 | York | 375/340 |
| 4,704,582 | 11/1987 | Dixon et al. | 375/329 X |
| 4,788,696 | 11/1988 | Sakane et al. | 375/362 |
| 4,991,184 | 2/1991 | Hashimoto | 371/5.5 |
| 4,998,264 | 3/1991 | Woodward | 375/119 |
| 5,105,423 | 4/1992 | Tanaka et al. | 371/5.5 |
| 5,157,694 | 10/1992 | Iwasaki et al. | 375/329 X |
| 5,280,538 | 1/1994 | Kataoka et al. | 375/329 X |

OTHER PUBLICATIONS

Electronics Information and Communication Assoication, Fall 1990 National Conference, "Structure and Performance of the B/300 p/4–Shift QPSK Baseband Differential Detector", by Denno, Sawahashi and Saito, of NTT Radio Communications Systems Laboratories.

*Primary Examiner*—Chi H. Pham
*Assistant Examiner*—Bryan Webster
*Attorney, Agent, or Firm*—Jordan and Hamburg LLP

[57] ABSTRACT

A framing and voice decoder part outputs an error information. An error ratio monitoring part monitors a bit error ratio based on the error information. A sampling rate changing part decides a sampling rate based on the bit error ratio and changes a number of bits of each shift register in the differential detector part to adapt the sampling rate. A sampling clock selector part selects one clock signal among four different frequency clock signals based on the decision of the sampling rate changing part and gives selected clock signal to the differential detector part as a sampling clock. The differential detector part makes demodulation in DQPSK (Differential Quadrilateral Phase Shift Keying). Since the error ratio is always maintained within a predetermined extent, a good voice quality is obtained. Since the sampling rate will not increase to unnecessarily high levels, power saving can be achieved and a consumption of batteries is reduced.

13 Claims, 3 Drawing Sheets

METHOD FOR RECEIVING DIGITAL RADIO SIGNALS AND A DIGITAL RADIO SIGNALS RECEIVER

BACKGROUND OF THE INVENTION

1. Field of the Invention

The present invention relates to a digital radio communication system and in particular, to a method for receiving digital radio signals and a digital radio signals receiver which can minimize power consumption and maintain good voice quality. This invention is useful for digital mobile radiotelephones, digital cellular radiotelephones, digital cordless telephones, Personal HandyPhone system and the like.

2. Description of the Prior Art

FIG. 3 is a block diagram which shows the main parts of a conventional digital radio signal receiver.

Digital radio signal receiver 300 comprises radio frequency (RF) part 11 which amplifies radio frequency signals received by an antenna and converts them to intermediate frequency signals using predetermined frequency signals from a local oscillator, intermediate frequency (IF) part 12 which amplifies the intermediate frequency signals, differential detector part 13 was designed for demodulation of differential quadrilateral phase shift keying (DQPSK), parallel-to-serial (P/S) converter part 14 which converts parallel signals to a serial signal, framing part and voice decoder part 15 which outputs error information and extracts voice data from the serial signal, speaker 16 which produces a voice based on the voice data, microprocessor unit (MPU) 17 which performs a retransmission request based on the error information, bit timing recovery (BTR) part 18 which supplies regenerated synchronous clock signal to P/S part 14, and clock generator 19 which produces a sampling clock $32f$ to differential detector part 13 and synchronous clock to the BTR part 18.

A system similar to digital radio signal receiver 300 is disclosed for example in "Performance of π/4-Shift QPSK Baseband Differential Detector; NTT Radio Communication Systems Laboratories; The National Conference of the Institute of Electronics and Communications Engineers, Autumn 1990".

In conventional digital radio signal receiver 300, the frequency of the sampling clock $32f$ fed to differential detector part 13 is 32 times higher than a symbol rate frequency, for example, 192 kHz. In this case, as the sampling rate frequency, for example, 6.144 MHz is high enough, a good voice quality is obtained when used for digital mobile radiotelephones, digital cellular radiotelephones, digital cordless telephones and the like.

However, when the sampling rate is maintained at the high frequency, a power consumption in differential detector part 13 increases and arises a problem arises that batteries contained within digital mobile radiotelephones, digital cellular radiotelephones, digital cordless telephones and the like are consumed faster. On the other hand, if the sampling rate frequency is maintained low, power consumption in the differential detector part 13 decreases. However, the voice quality becomes worse, because a stability against a fading, multipath and similar effects becomes low.

SUMMARY OF THE INVENTION

The object of the invention is to provide a digital radio communication systems which can minimize a power consumption and maintain a good voice quality.

According to one aspect of the invention a digital radio communication system comprises a digital radio signals receiver. The receiver includes a differential detector, a framing portion and voice detector, an error ratio monitor, a sampling rate changing module and a sampling clock selector.

The differential detector for demodulation of DQPSK signals, which are used in a digital radio signal receiver, employs plural shift registers which are adapted to change a number of bits of each shift register. A framing portion and, voice detector generates error information and extracts voice data from the serial signal, and converts I and Q parallel output signals of the differential detector to serial signals.

An error ratio monitor detects an error information regarding digital demodulation and calculates a bit error ratio E on the basis of the error information of the framing portion and voice detector. A sampling rate changing module changes a sampling rate for digital demodulation based on a signal from the error ratio monitor. The sampling rate is shifted to a higher frequency than a present frequency when the error ratio exceeds a specified upper limit, for example a bit error ratio of $10^{-2}$, and a lower frequency when the error ratio falls below a specified lower limit, for example a bit error ratio of $10^{-3}$. A sampling clock selector supplies a selected preferable sampling clock signal which is, determined by the sampling rate changing module to, the differential detector. The sampling clock signal has a frequency of N (N is an integer) times higher than a symbol rate frequency.

In the configuration described above, the error ratio may be for example, a frame error ratio or similar in the framing portion and voice detector. Additionally the specified upper limit is generally greater than the specified lower limit, however, the specified upper limit may be equal to the specified lower limit.

The present invention is applied to digital modulation systems such as π/4-shift differential quadrilateral phase shift keying (π/4 DQPSK), differential quadrilateral phase shift keying (DQPSK), quadrilateral phase shift keying (QPSK), phase shift keying (PSK), quadrilateral amplitude modulation (QAM), gaussian minimum shift keying (GMSK), and minimum shift keying (MSK).

In the digital radio signal receiver of the invention, when the error ratio exceeds the specified upper limit, the sampling rate for digital demodulation is changed to higher frequency than a sampling frequency which is actually used. As a result, the stability against fading, multipath and similar effects becomes higher and the error ratio is decreased. When the error ratio falls below the specified lower limit, the sampling rate for digital demodulation is changed to a lower frequency. As a result, stability against fading, multipath and similar effects becomes lower and the error ratio is increased. Therefore, the error ratio is kept between the specified upper and lower limits, and, the power consumption power is minimized.

DETAILED DESCRIPTION OF THE PREFERRED EMBODIMENTS

Figure 1:
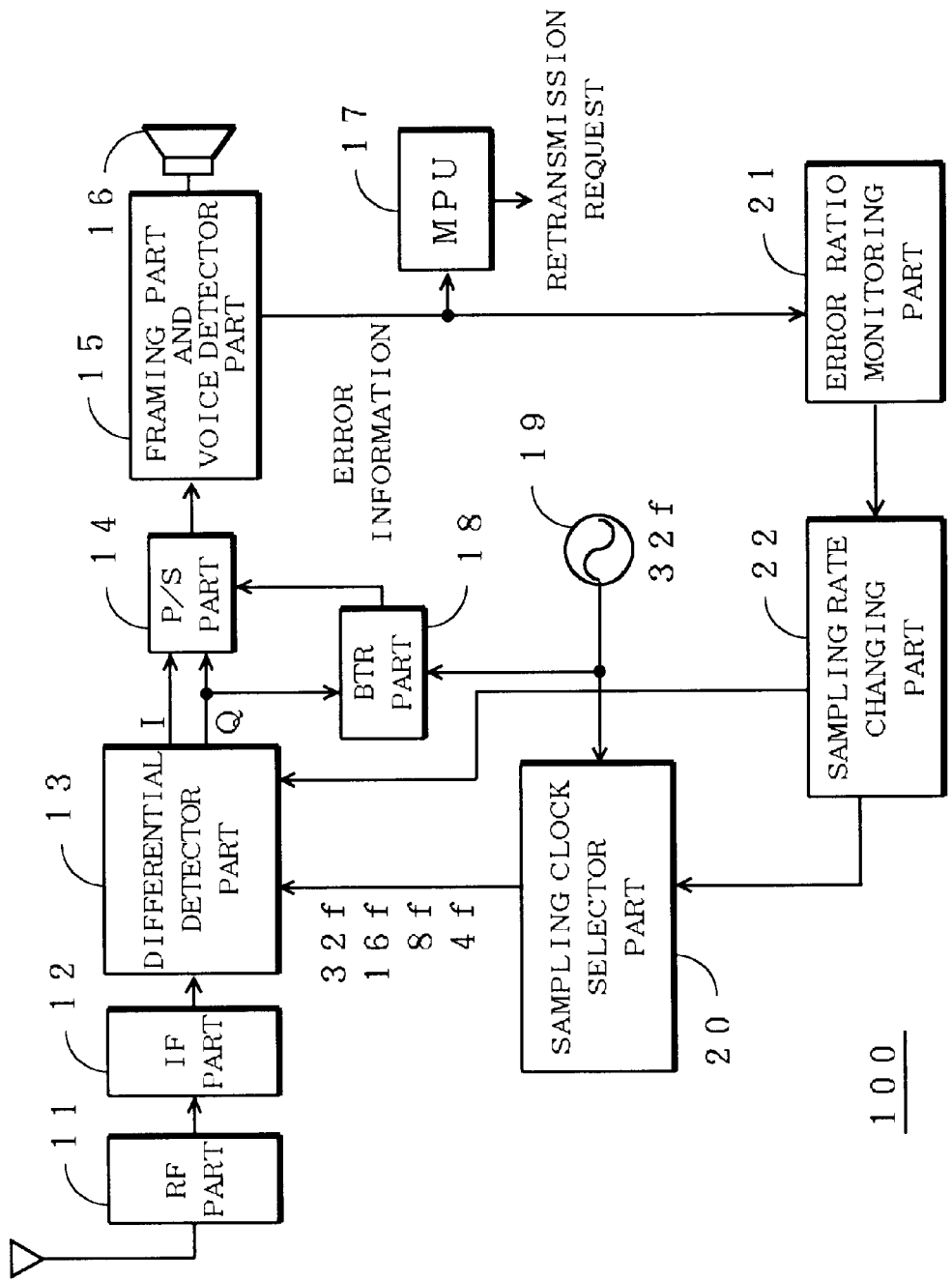
FIG. 1 is a block diagram showing the main parts of an embodiment of the digital radio signal receiver of the invention.

FIG. 1 is a block diagram which shows a main parts of the digital radio signal receiver of the invention.

Digital radio signal receiver 100 comprises RF part 11 which amplifies radio frequency signals received by an antenna and converts them to intermediate frequency signals by using predetermined frequency signals from a local oscillator, IF part 12 which amplifies the intermediate frequency signals, differential detector part 13 for DQPSK demodulation P/S part 14 which converts parallel signals to a serial signal, framing part and voice decoder part 15 which generates error information and extracts voice data from the serial signal produced by P/S part 14, speaker 16 which produces a voice based on the voice data, MPU 17 which carries out a retransmission request based on the error information, BTR part 18 which supplies a regenerated synchronous clock signal to P/S part 14, and clock generator 19 which supplies a synchronous clock to BTR part 18.

The above configuration is basically similar to the conventional configuration shown in FIG. 1. However, the following features differ from the conventional configuration.

Differential detector part 13 has shift registers as does the differential detector part 13 in FIG. 1 and outputs a I signal and Q signal. A number carried by bits of each shift register of differential detector part 13 are changeable. Differential detector part 13 is provided with a sampling clock selected from clock signals $32f$, $16f$, $8f$ and $4f$ by sampling clock selector part 20.

Sampling clock selector part 20 selects one clock signal from among a clock signal $32f$ generated by clock generator 19, and clock signals $16f$, $8f$ and $4f$ obtained by dividing the clock signal $32f$. Sampling clock selector part 20 supplies a selected clock signal, for example the clock signal $16f$ which is determined by sampling rate changing part 22, to the differential detector part 13 as the sampling clock.

Error ratio monitoring part 21 calculates a bit error ratio E based on the error information from framing part and voice detector part 15 and monitors the bit error ratio E.

Sampling rate changing part 22 selects a sampling rate based on the bit error ratio E of error ratio monitoring part 21 and changes the sampling rate for an other sampling rate, for example the clock signal $8f$ of which is generated from sampling clock selector part 20. Therefore, sampling rate changing part 22 changes a number of bits of each shift register in differential detector part 13 to adapt a preferable sampling rate.

Figure 2:
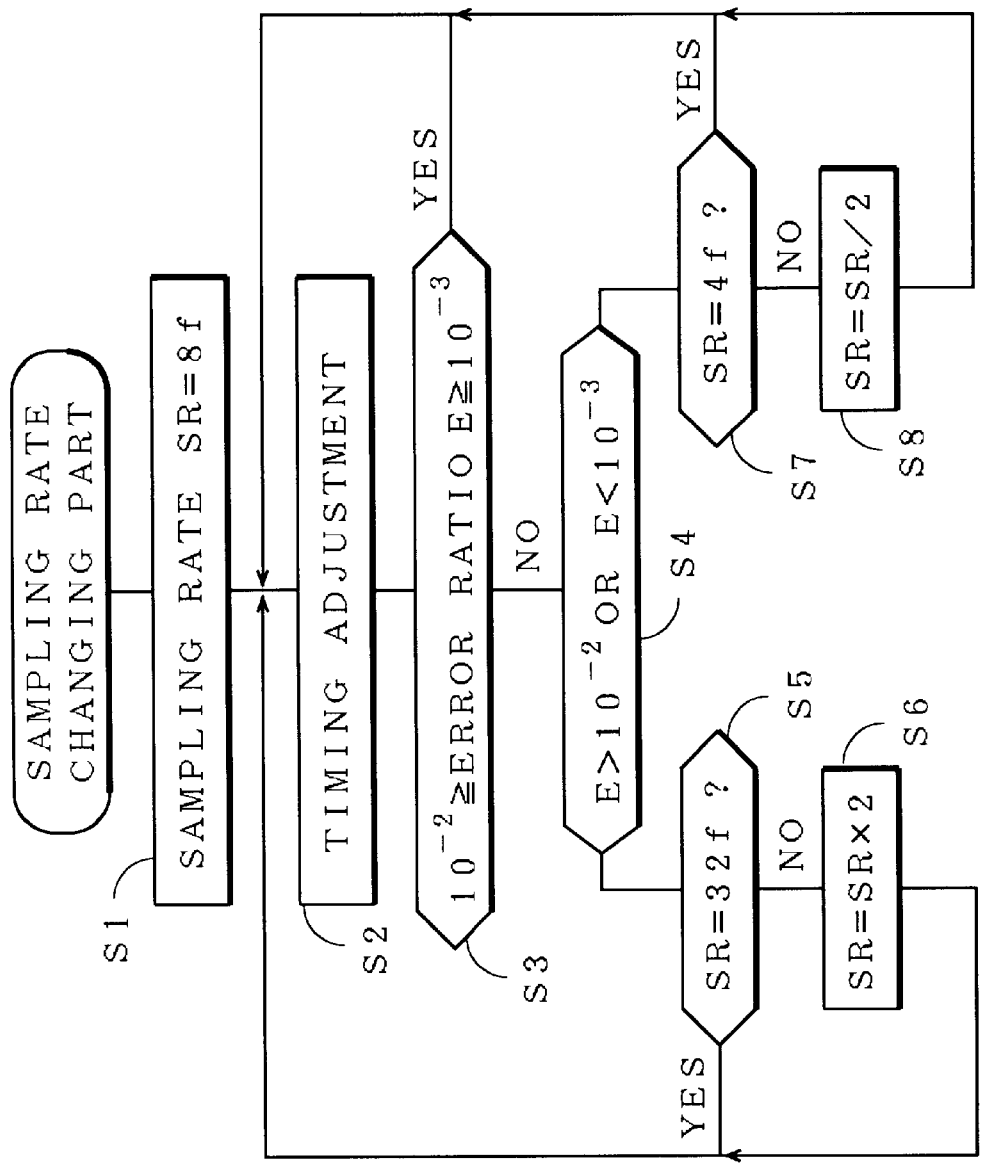
FIG. 2 is a flow chart showing the operation for changing the sampling rate in the digital radio signal receiver shown in FIG.1.
Figure 3:
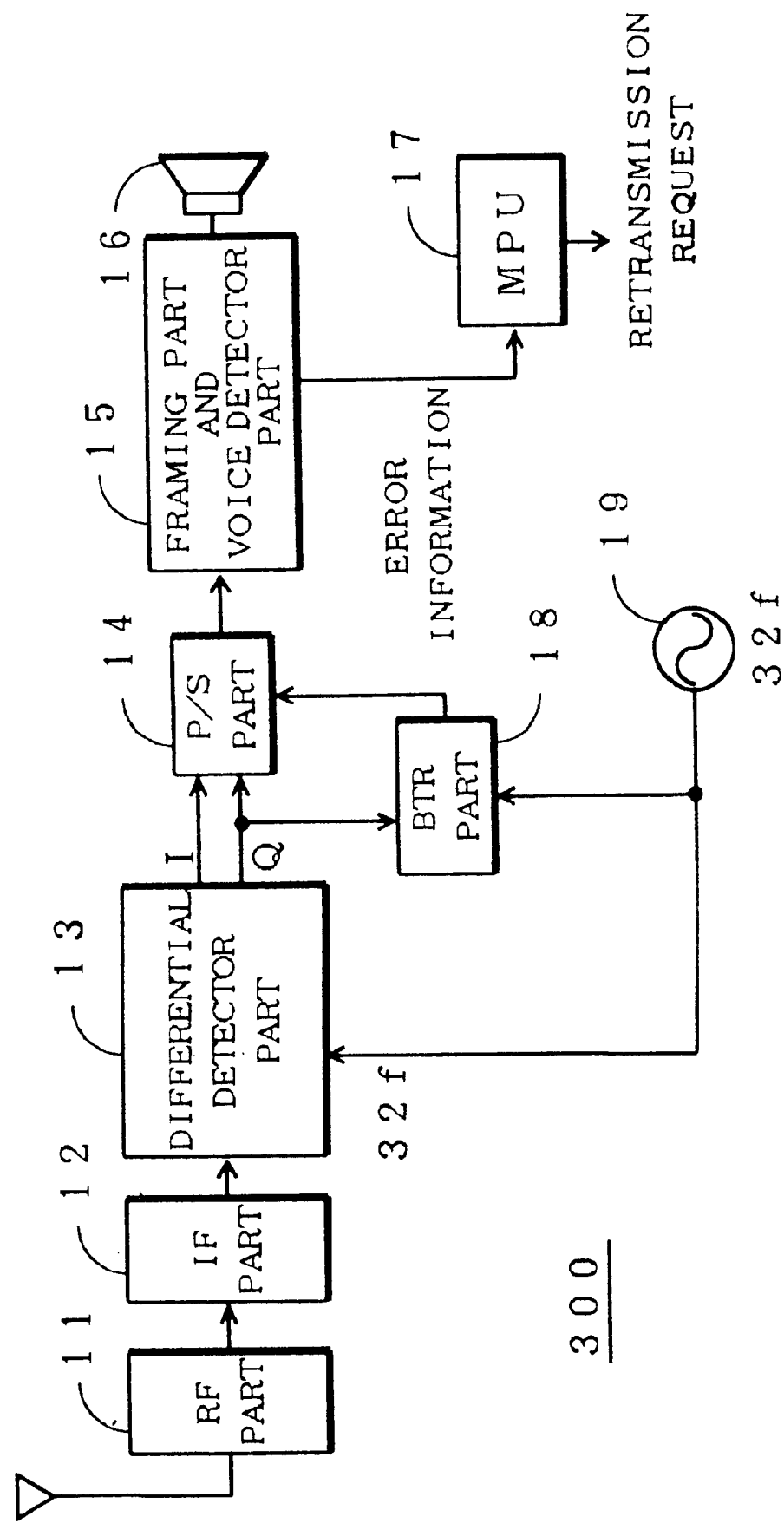
FIG. 3 is a block diagram showing the main parts of the conventional digital radio signal receiver.

FIG. 2 is a flow chart which shows the operation of the sampling rate changing part 22 for selecting the sampling rate.

In step S1, sampling rate changing part 22 is made so that sampling rate SR becomes $8f$ responsive to the bit error ratio E.

In step S2, the sampling rate changing part 22 makes timing adjustment for receiving new bit error ratio E.

In step S3, sampling rate changing part 22 checks whether bit error ratio E is located between the upper limit i.e. $10^{-2}$ and the lower limit i.e. $1^{-3}$ ($10^{-2} \geq E \geq 10^{-3}$) or not. If so, the operation of sampling rate changing part 22 returns to step S2 for receipt of a next bit error ratio and the present sampling rate SR is held at $8f$. Otherwise, the operation proceeds to step S4.

In step S4, sampling rate changing part 22 checks whether bit error ratio E is greater than $10^{-2}$ ( $E>10^{-2}$) or the ratio E is smaller than $10^{-3}$ ($E<10^{-3}$). If the ratio E is greater than $10^{-2}$ the operation proceeds to step S4. If the ratio E is smaller than $10^{31\ 3}$, the operation proceeds to step S7.

In step S5, sampling rate changing part 22 checks whether the sampling rate SR is set to $32f$ or not. If the sampling rate SR is set to $32f$, the operation returns to step S2 without taking any action since the sampling rate SR is already at the highest. If the sampling rate SR is set to $16f$, smaller than $32f$ in step S3, the operation proceeds to step S6.

In step S6, sampling rate changing part 22 changes the sampling rate SR into two times higher than the present sampling rate $16f$ and the operation returns to step S2.

In step S7, sampling rate changing part 22 checks whether the sampling rate SR is set to $4f$ or not. If the sampling rate SR is $4f$, the operation returns to step S2 without taking any action since the sampling rate SR is already at the lowest. If the sampling rate SR is greater than $4f$, the operation proceeds to step S8.

In step S8, the sampling rate changing part 22 changes the sampling rate SR to one half the present sampling rate $8f$ and the operation returns to step S2 to receive a next bit error ratio.

In digital radio signal receiver 100, the bit error ratio E is kept between $10^{-2}$ to $10^{-3}$ under normal environments, thereby, good voice quality is obtained. Also, since the sampling rate SR can be changed in four steps, namely $32f$, $16f$, $8f$ and $4f$, the power consumption in differential detection part 13 can be changed in four steps, namely 100%, 50%, 25% and 12.5% (wherein 100% corresponds with the sampling rate $32f$). Therefore, the power consumption is lowered in comparison to the conventional case in which the sampling rate SR is fixed to $32f$, and a rate of consumption of batteries contained within digital mobile radiotelephones, digital cellular radiotelephones, digital cordless telephones and similar devices is reduced.

If the sampling rate SR is set to any of sampling clocks $32f$, $16f$ and $4f$ by sampling rate changing part 22, the steps of the operation of part 22 from step S2 to step S8 are respectively repeated to employ a preferable sampling rate. According to a digital radio communication system of the invention, since the error ratio is kept between the predetermined upper limit and the predetermined lower limit, good voice quality is obtained. Also, since the sampling rate is not increased to unnecessarily high frequency, power saving are achieved.

What is claimed is:

1. A method for receiving digital radio signals at a predetermined transmission rate, comprising the steps of:

monitoring a bit error ratio for digital demodulation; and changing a sampling rate for digital demodulation of said digital radio signals at said predetermined transmission rate to a higher level when the bit error ratio exceeds a specified upper limit and to a lower level when the bit error ratio falls below a specified lower limit.

2. The method according to claim 1, wherein a digital modulation system of the digital demodulation is selected from π/4-shift differential quadrilateral phase shift keying, quadrilateral phase shift, and phase shift keying.

3. A digital radio signal receiver for receiving digital radio signals at a predetermined transmission rate, comprising:

a digital demodulation means for demodulating said digital radio signals;

a bit error ratio monitoring means for monitoring a bit error ratio in the digital demodulation means; and a sampling rate changing means for changing a sampling rate at which said digital radio signals at said predetermined transmission rate are sampled for digital demodulation to a higher level when the bit error ratio exceeds a specified upper limit and to a lower level when the bit error ratio falls below a specified lower limit based on a signal from the bit error ratio monitoring means.

4. A digital radio signal receiver, comprising:

a digital demodulation means for demodulating a digital radio signal;

a bit error ratio monitoring means for monitoring a bit error ratio in the digital demodulation means;

a sampling rate changing means for changing a sampling rate of the digital demodulation means to a higher level when the bit error ratio exceeds a specified upper limit and to a lower level when the bit error ratio falls below a specified lower limit based on a signal from the bit error ratio monitoring means; and a digital modulation system of the digital demodulation means being one of $\pi/4$-shift differential quadrilateral phase shift keying and differential quadrilateral phase shift keying, the digital demodulation means being a differential detector having shift registers, and the sampling rate changing means changing a frequency of a sampling clock and changing a number of bits of each of said shift registers in the differential detector to adapt to the frequency of the sampling clock.

5. A digital radio signal receiver for receiving digital radio signals at a predetermined transmission rate, comprising:

a differential detector for demodulating said digital radio signals in said digital radio signal receiver;

a bit error ratio monitor for detecting an error information of digital demodulation and calculating a bit error ratio on the basis of said error information;

a sampling rate changing module for changing a sampling rate at which said digital radio signals at said predetermined transmission rate are sampled in said differential detector for digital demodulation based on a signal from said bit error ratio monitor, said sampling rate being shifted to a higher frequency than a present frequency when said bit error ratio goes beyond a specified upper limit and to lower frequency when the bit error ratio falls below a specified lower limit; and a sampling clock selector for supplying sampling clock signals determined by said sampling rate changing module to said differential detector.

6. A digital radio signal receiver according to claim 5, wherein said sampling clock signals are any frequency of N times higher than a symbol rate frequency where N is an integer.

7. A digital radio signal receiver according to claim 5, wherein said sampling clock signals are any of 32 times said symbol rate frequency, 16 times said symbol rate frequency, 8 times said symbol rate frequency and 4 times said symbol rate frequency.

8. A digital radio signal receiver for receiving digital radio signals at a predetermined transmission rate, comprising:

a differential detector for demodulating said digital radio signals in said digital radio signal receiver to produce a demodulated digital signal;

a bit error ratio monitor for detecting errors in the demodulated digital signal and calculating a bit error ratio;

a sampling rate changing module for changing a sampling rate at which said digital radio signals at said predetermined transmission rate are sampled in said differential detector for digital demodulation based on a signal from said bit error ratio monitor, said sampling rate being shifted to a higher frequency than a present frequency when said bit error ratio goes beyond a specified upper limit and to a lower frequency when the bit error ratio falls below a specified lower limit;

a sampling clock selector for supplying sampling clock signals determined by said sampling rate changing module to said differential detector; and said upper limit of said bit error ratio being $10^{-2}$ and said lower limit of said bit error ratio being $10^{-3}$.

9. A digital radio signal receiver comprising:

a differential detector for demodulating a digital signal in said digital radio signal receiver;

a bit error ratio monitor for monitoring an error information signal, detecting errors in the demodulated digital signal, and calculating a bit error ratio;

a sampling rate changing module for changing a sampling rate for digital demodulation of said digital signal at a given transmission rate based on a signal from said bit error ratio monitor, said sampling rate for digital demodulation being shifted to a higher frequency than a present frequency when said bit error ratio goes beyond a specified upper limit and to a lower frequency when the bit error ratio falls below a specified lower limit;

a sampling clock selector for supplying sampling clock signals determined by said sampling rate for digital demodulation changing module to said differential detector; and a framing portion and voice detector for generating said error information for digital demodulation.

10. A digital radio signal receiver comprising:

a differential detector for demodulating a digital signal in said digital radio signal receiver;

a bit error ratio monitor for monitoring an error information signal, detecting errors in the demodulated digital signal, and calculating a bit error ratio;

a sampling rate changing module for changing a sampling rate for digital demodulation of said digital signal at a given transmission rate based on a signal from said bit error ratio monitor, said sampling rate for digital demodulation being shifted to a higher frequency than a present frequency when said bit error ratio goes beyond a specified upper limit and to a lower frequency when the bit error ratio falls below a specified lower limit;

a sampling clock selector for supplying sampling clock signals determined by said sampling rate for digital demodulation changing module to said differential detector;

a framing portion and voice detector for generating said error information for digital demodulation; and said error ratio monitor receiving and detecting said error information from said framing portion and voice detector.

11. A method for receiving digital radio signals comprising the steps of:

detecting an error information for digital demodulation;

calculating a bit error ratio from said error information;

producing a sampling rate for digital demodulation of said digital radio signal at a given transmission rate based on said bit error ratio;

changing said sampling rate for digital demodulation into a higher frequency when said bit error ratio goes beyond a specified upper limit and to a lower frequency when the bit error ratio falls below a specified lower limit; and supplying a sampling clock signal determined by said sampling rate for digital demodulation.

12. A method for receiving digital radio signals according to claim 11, wherein the steps of supplying a sampling clock signal includes supplying any frequency of N times higher than a symbol rate frequency where N is an integer.

13. A method for receiving digital radio signals according to claim 11, wherein the step of supplying said sampling clock signal includes supplying said sampling clock signal at any of 32 times said symbol rate frequency, 16 times said symbol rate frequency, 8 times said symbol rate frequency and 4 times a symbol rate frequency.

* * * * *